United States Patent [19]

Baker et al.

[11] Patent Number: 4,764,302

[45] Date of Patent: Aug. 16, 1988

[54] THICKENING SYSTEM FOR INCORPORATING FLUORESCENT WHITENING AGENTS

[75] Inventors: Gregory M. Baker, Pittsburg; James P. Farr, Pleasanton; Daniel T. Carty, Danville, all of Calif.

[73] Assignee: The Clorox Company, Oakland, Calif.

[21] Appl. No.: 921,281

[22] Filed: Oct. 21, 1986

[51] Int. Cl.[4] .......................... C09K 11/06; C11D 3/39; C11D 9/42; C11D 3/42

[52] U.S. Cl. .......................... 252/301.23; 252/95; 252/96; 252/100; 252/102; 252/186.26; 252/186.28; 252/186.29; 252/301.21; 252/315.1; 252/545; 252/404; 252/DIG. 14; 252/558

[58] Field of Search .................... 252/95, 96, 100, 545, 252/102, 301.23, 315.1, 186.26, 186.28, 186.29, 558, 301.21

[56] References Cited

U.S. PATENT DOCUMENTS

| | | | |
|---|---|---|---|
| 3,393,153 | 7/1968 | Zimmerer et al. | 252/95 |
| 3,417,023 | 12/1968 | Di Salvo | 252/118 |
| 3,655,566 | 4/1972 | Robinson et al. | 252/95 |
| 3,767,587 | 10/1973 | Claussen et al. | 252/301.2 W |
| 3,852,210 | 12/1974 | Krezanoski | 252/95 |
| 3,869,401 | 3/1975 | Ernst | 252/186 |
| 3,904,544 | 9/1975 | Clark et al. | 252/301.2 W |
| 3,951,598 | 4/1976 | Arashi et al. | 8/169 |
| 3,962,115 | 6/1976 | Clark et al. | 252/301.23 |
| 3,970,575 | 7/1976 | Barrett, Jr. | 252/95 |
| 3,989,638 | 11/1976 | Bradley et al. | 252/186 |
| 4,028,263 | 6/1977 | Gray | 252/99 |
| 4,070,442 | 1/1978 | Watts | 423/272 |
| 4,130,501 | 12/1978 | Lutz et al. | 252/95 |
| 4,216,111 | 8/1980 | Thompson | 252/301.23 |
| 4,233,167 | 11/1980 | Sramek | 252/8.75 |
| 4,238,192 | 12/1980 | Kandathil | 8/111 |
| 4,265,631 | 5/1981 | Becker | 8/471 |
| 4,311,605 | 1/1982 | Eckhardt et al. | 252/102 |
| 4,339,238 | 7/1982 | Fringeli et al. | 8/527 |
| 4,347,149 | 8/1982 | Smith et al. | 252/102 |
| 4,362,706 | 12/1982 | Willard | 423/273 |
| 4,430,236 | 2/1984 | Franks | 252/95 |
| 4,448,705 | 5/1984 | Gray | 252/102 |
| 4,470,919 | 9/1984 | Goffinet et al. | 252/102 |
| 4,497,718 | 12/1985 | Neiditch et al. | 252/8.75 |
| 4,510,068 | 4/1985 | Rohlfs et al. | 252/186.29 |
| 4,525,291 | 6/1985 | Smith et al. | 252/95 |
| 4,526,700 | 7/1985 | Hensley et al. | 252/102 |
| 4,552,682 | 11/1985 | Black et al. | 252/186.26 |
| 4,562,002 | 12/1985 | Neiditch et al. | 252/8.75 |
| 4,655,781 | 4/1987 | Hsieh et al. | 8/111 |

FOREIGN PATENT DOCUMENTS

| | | |
|---|---|---|
| 0007604 | 2/1980 | European Pat. Off. . |
| 0128619 | 12/1984 | European Pat. Off. . |
| 0156438 | 10/1985 | European Pat. Off. . |
| 0193360 | 9/1986 | European Pat. Off. . |
| 2246831 | 4/1973 | Fed. Rep. of Germany . |
| 2633261 | 2/1977 | Fed. Rep. of Germany . |
| 2816746 | 4/1978 | Fed. Rep. of Germany . |
| 2113834 | 10/1979 | Fed. Rep. of Germany . |
| 2305532 | 10/1976 | France . |
| 2018844 | 10/1979 | United Kingdom . |

OTHER PUBLICATIONS

Kirk-Othmer, *Encyclopedia of Chemical Technology*, vol. 3, John Wiley and Sons, 1978, pp. 128–142, 146–148.

Kirk-Othmer, *Encyclopedia of Chemical Technology*, vol. 19, John Wiley and Sons, 1982, pp. 805–806, 825.

*Primary Examiner*—Prince E. Willis

*Attorney, Agent, or Firm*—Michael J. Mazza; Joel J. Hayashida; Stephen M. Westbrook

[57] ABSTRACT

A thickening system for laundry products incorporates low levels of a fluorescent whitening agent or dye, a surfactant and an acidic pH adjusting agent. At the acidic pH, the fluorescent whitening agent precipitates as a colloidal particle, and is stabilized by associating with the surfactant, resulting in thickening. Optionally, a $C_{6-18}$ soap synergistically increases viscosity. The thickening system may be formulated with a bleaching product and preferably with a peroxide bleach product.

22 Claims, No Drawings

THICKENING SYSTEM FOR INCORPORATING FLUORESCENT WHITENING AGENTS

BACKGROUND OF THE INVENTION

1. Field of the Invention

This invention relates to a thickening system for cleaning products comprising a surfactant, a fluorescent whitening agent or dye and a pH adjusting agent, and more particularly to a liquid oxidant bleach laundry composition thickened with such a system.

2. Description of the Prior Art

Much prior art has addressed the development of thickened household laundry products such as detergents or bleaches. Consumer preference for such thickened products is well documented, and applications include prewash products or hard surface cleaners which require concentrating the active ingredients and/or the capability to cling to surfaces. Typical thickeners of the prior art include surfactants, polymers, or combinations of polymers and surfactants. Various disadvantages are associated with such prior art thickening systems. To the extent that a thickened laundry product requires the addition of components solely for thickening, the cost of the product is increased. Many prior art thickeners are incompatible with oxidizing species, e.g., bleaches.

Liquid bleaches have been known and used in a variety of household applications for a great many years. Chlorine bleaches are used extensively since they are highly effective, inexpensive, and simple to produce. In certain applications, however, non-chlorine, e.g. peroxygen or peracid bleaches are preferred. For maximum effect, non-chlorine bleaches should contain surfactants for detergency, fluorescent whiteners or optical brighteners to increase fabric reflectance, and dyes for producing a pleasing color. Peroxide bleaching compositions of the prior art have not been commercially successful due to problems with stability of the composition when formulated with such additives.

Prior art efforts to develop peroxide laundry products include compositions described in U.S. Pat. No. 4,430,236 issued to Franks, which describes peroxide combined with a detergent-effective amount of a nonionic surfactant, and a fluorescent whitening agent. Franks also discloses the use of a chelating agent in an effort to stabilize the hydrogen peroxide bleach, and the use of a solvent to reduce the viscosity of the composition. U.S. Pat. No. 4,448,705 issued to Grey describes a peroxy bleach with a chelating agent, a bleach activator such as a polyacylated amine, anionic, nonionic, zwitterionic, or cationic surfactants, and may include optical brighteners. Barrett, U.S. Pat. No. 3,970,575 describes a peroxide bleach with a nonionic surfactant and phthalocyanine blue dye. Krezanoski, U.S. Pat. No. 3,852,210 describes a peroxygen containing concentrate formulated with a polyoxypropylene copolymer, a betaine surfactant, and an acid or base to adjust the pH. The formulation may also include a chelating agent, and is primarily intended for germicidal use, although fabric bleaching is mentioned. U.S. Pat. No. 4,347,149 issued to Smith et al describes a detergent composition of hydrogen peroxide, ethanol plus amino compounds as stabilizers, phosphonate compounds, and anionic, nonionic, or amphoteric surfactants. U.S. Pat. No. 4,525,291 also issued to Smith et al describes peroxide-containing compounds including a builder, anionic or nonionic surfactants and alkyl metal aryl hydrotropes for phase stability, and can include optical brighteners. Goffinet et al, U.S. Pat. No. 4,470,919 discloses a hydrogen peroxide bleach composition incorporating a surfactant and a fatty acid. Lutz et al, U.S. Pat. No. 4,130,501 describes a viscous peroxide bleach containing from 0.5 to 4% of an anionic or nonionic surfactant and thickened with a copolymer of carboxylic acid with a polyol. No optical brighteners are included in the formulations of Lutz et al. U.S. Pat. No. 4,526,700 issued to Hensley et al discloses an unthickened formulation having a fluorescent whitening agent of the stilbene type formed into fibrous particles by coprecipitating the whitener with a sulfonate surfactant in aqueous hypochlorite at a basic pH. Neiditch et al, U.S. Pat. No. 4,497,718, and 4,562,002 describe a viscous fabric softening composition containing a cationic surfactant, a stilbene fluorescent whitening agent and a non-ionizable base. Robinson et al, U.S. Pat. No. 3,655,566 describes a nonthickened bleaching composition including fluorescent whitening agents and anionic or nonionic surfactants, and having a pH above about 10. Claussen et al, U.S. Pat. No. 3,767,587 shows a nonthickened aqueous dispersion of fluorescent whitening agents and anionic, cationic or amphoteric surfactants. Eckhardt et al, U.S. Pat. No. 4,311,605 discloses an unthickened laundry composition including fluorescent whitening agents and surfactants. Thompson, U.S. Pat. No. 4,216,111 shows a colloidal suspension of high levels of fluorescent whitening agent by flocculating the fluorescent whitening agent with an acid, then deflocculating by basification. Becker, U.S. Pat. No. 4,265,631 describes a stable aqueous suspension of high levels of fluorescent whitening agent or dye with an aminoplast precondensate and a nonionic copolymer. Clark et al, U.S. Pat. No. 3,904,544 and 3,912,115 are exemplary of art teaching thickened suspensions of fluorescent whitening agents. These references both teach preparation of a thixotropic slurry containing high levels of a fluorescent whitening agent with a surfactant. Thickening appears to occur due to the high solids content.

Generally, the art showing thickened compositions including fluorescent whitening agents teaches thickening by a high solids (fluorescent whitening agent) content, or by including additional components, e.g., polymers, to achieve the thickening. Aqueous suspensions of fluorescent whitening agents of the art are generally not at acidic pHs.

SUMMARY OF THE PRESENT INVENTION

It is therefore an object of the present invention to provide a stable thickening system incorporating low levels of a fluorescent whitening agent as part of the thickening system.

It is another an object of the present invention to provide a stable, thickened bleach composition containing a fluorescent whitening agent.

It is yet another object of the invention to provide a composition which can be formulated to be sufficiently thick to be used as a hard surface cleaner, or to suspend abrasives.

It is another object of the present invention to provide a viscous formulation of fluorescent whitening agents.

It is another object of the present invention to provide a stable, thickened peroxygen bleach composition incorporating surfactants, and fluorescent whitening agents for a commercially acceptable product.

Briefly, in one embodiment the present invention comprises the essential components of, in aqueous solution:

a surfactant;

a fluorescent whitening agent; and a pH adjusting agent to adjust the composition pH to about two to six. Optionally, a $C_{6-18}$ soap can be included to synegistically increase viscosity.

The thickener can be used to thicken a variety of liquid laundry product compositions, including bleaches and detergents, and can be formulated as a high viscosity gel or paste. Typically, the thickening system will be used in amounts effective to attain an intermediate viscosity (200–500 centipoise) for products such as hard surface cleaners which need sufficient residence time for use on nonhorizontal surfaces. More typically, the thickening system may be formulated to have a viscosity on the order of 100–300 centipoise (cP) for use with a laundry product to enhance pourability and allow concentration of the product on heavily stained areas of fabric.

In an second embodiment, the present invention is formulated as a thickened bleaching product and includes the essential components of, in aqueous solution:

a bleach; and the thickening system comprising the surfactant, the fluorescent whitening agent and the pH adjusting agent.

A formulation of the second embodiment includes an oxidant bleach, and the thickening system comprising the fluorescent whitening agent, surfactant and optionally, the $C_{6-18}$ soap. The bleach would preferably be a peroxygen or peracid bleach, although virtually any oxidant capable of operating at acidic pHs could be used. The formulation would have utility in improved pourability, or as a prewash.

In a third embodiment, the invention is formulated as a stable, thickened hydrogen peroxide bleaching product and includes the essential components of, in aqueous solution:

a hydrogen peroxide bleach;

a stabilizing system comprising a chelating agent and a preservative;

the thickening system comprising the surfactant, fluorescent whitening agent, and the pH adjusting agent.

The thickening peroxide bleach is advantageously formulated as a consumer acceptable product, thus a stabilizing system is present to ensure shelf and storage longevity, a whitener is included to increase fabric reflectance and the user's perception of brightness, a dye may be present to produce a pleasing color and the ternary thickening system provides a viscous solution. The fluorescent whitening agent functions as one component of the thickening system, reducing the total level of organic components needed. Optionally, the $C_{6-18}$ soap may be included to enhance viscosity.

It is therefore an advantage of the present invention that a viscous stable composition of a fluorescent whitening agent is provided.

It is another advantage of the present invention that a cleaning product can be formulated to achieve a viscosity sufficient to enable its use as a hard surface cleaner with efficacy on nonhorizontal surfaces, or to suspend abrasives therein.

It is a further advantage of the present invention to provide a thickening system for laundry products with low levels of a fluorescent whitening agent wherein the whitening agent is one component of the thickening system.

It is a further advantage of the present invention that a consumer acceptable, stabilized, thickened peroxide bleach composition can be formulated.

It is yet another advantage of the present invention to provide a thickened peroxide bleaching composition which remains stable throughout a typical storage life.

These and other objects and advantages of the present invention will become apparent from a review of the following Detailed Description of the Preferred Embodiment.

DETAILED DESCRIPTION OF THE PREFERRED EMBODIMENT

In the first embodiment, the thickening system of the present invention comprises the essential ingredients of, in aqueous solution:

a surfactant a pH adjusting agent; and a fluorescent whitening agent.

The above ingredients will be described in greater detail in the following sections.

Surfactant

The surfactant functions as one component of the thickening system, also including the pH adjusting agent and fluorescent whitening agent. In addition to thickening, the surfactant advantageously also performs its normal soil removal function. The thickening effect of the surfactant and the fluorescent whitening agent is thought to be due to stabilization of a colloid of the fluorescent whitening agent by the surfactant. The surfactant must be compatible with an acidic pH and, in embodiments of the invention incorporating a bleach, must be resistant to oxidation by the bleach. The most preferred surfactants are the nonionics, for example, polyethoxylated alcohols, ethoxylated akyl phenols, anhydrosorbitol, and alkoxylated anhydrosorbitol esters. An example of a preferred nonionic surfactant is a polyethoxylated alcohol manufactured and marketed by the Shell Chemical Company under the trademark "Neodol". Examples of preferred Neodols are Neodol 25-7 which is a mixture of 12 to 15 carbon chain length alcohols with about 7 ethylene oxide groups per molecule; Neodol 23-65, a $C_{12-13}$ mixture with about 6.5 moles of ethylene oxide; Neodol 25-9, a $C_{12-15}$ mixture with about 9 moles of ethylene oxide; and Neodol 45-7, a $C_{14-15}$ mixture with about seven moles of ethylene oxide.

Other nonionic surfactants useful in the present invention include a trimethyl nonyl polyethylene glycol ether, manufactured and marketed by Union Carbide Corporation under the Trademark Tergitol TMN-6, and an octyl phenoxy polyethoxy ethanol sold by Rohm and Haas under the Trademark Triton X-114. Brij 76 and Brij 97, trademarked products of Atlas Chemical Co., also thicken. The Brij products are polyoxyethylene alcohols, with Brij 76 being a stearyl alcohol with 10 moles of ethylene oxide per molecule and Brij 97 being an oleyl alcohol with 10 moles of ethylene oxide per molecule. While the exact nature of the thickening-effective association of surfactant with fluorescent whitening agent is not fully understood, it has been empirically determined that thickening-effective nonionic surfactants have a hydrophobic-lipophobic balance (HLB) of between about 11-13.

Certain amphoteric surfactants will thicken, most notably betaines and in particular a lauryl/myristyl amido propyl betaine sold by Miranol Chemical Company Inc. under the trademark Miratane BB.

Limited anionics, principally alkyl aryl sulfonates, and in particular Calsoft F-90, a trademarked product of Pilot Chemical Co. will thicken in combination with the fluorescent whitening agents of the invention.

The surfactant is present in the composition in an amount sufficient to stabilize the fluorescent whitening agent, generally about 1 to 20% by weight, more preferred is 1 to 10% by weight, and the most preferred range is about 2 to 5%. Because of co-surfactant thickening effects, high levels of surfactants, e.g. above 30%, tend to increase solution viscosity regardless of the fluorescent whitening agent concentration. It is within the scope of the invention to use mixtures of any of the above surfactants.

pH Adjusting Agent

It is essential that the pH range of the composition be compatible with the pH range of insolubility of the fluorescent whitening agents. Because acid-insoluble fluorescent whitening agents are used, the composition pH must also be acidic in order to maintain the fluorescent whitening agents in an undissolved state. Preferably, the pH adjusting agent is added in an amount sufficient to adjust the pH range to between about 2 and 6, and more preferably to between about 3 and 5. Resulting composition viscosities vary slightly depending on the type of acid used, and the final pH.

The composition of the present invention is an aqueous colloidal mixture having a high percentage of water. In the absence of the pH adjusting agent, the pH will normally be in a neutral to slightly basic range. It is to be understood that any agent added to the composition which results in the insolubilizing, thickening-effective pH is considered to be a pH adjusting agent even if pH adjustment is not its sole or primary function. Further, order of addition of other composition ingredients relative to the pH adjusting agent is not critical, although it is preferred to have the surfactant present when the fluorescent whitening agents are precipitated by the pH adjusting agent. For this reason, it is preferred that the pH adjusting agent be added to a mixture of the desired composition ingredients, i.e., surfactant and fluorescent whitening agent plus any optional components. Inorganic acids such as sulfuric acid ($H_2SO_4$), phosphoric acid ($H_3PO_4$), and hydrochloric acid (HCl) are preferred for pH adjustment. Organic acids, such as acetic acid, will also function. It is noted that depending on the composition, the addition of a separate acid may not be necessary to adjust the pH to the correct level. Many chelating agents are acidic and compositions utilizing such chelating agents may not need further added acid.

Fluorescent Whitening Agent

A fluorescent whitening agent (FWA), also referred to as an optical brightener, is an essential component of the thickening system of the invention, and associates with the surfactant to achieve the thickening. Such products are fluorescent materials, often substituted stilbenes and biphenyls, and have the ability to fluoresce by absorbing ultraviolet wave-lengths of light and re-emitting visible light. A preferred fluorescent whitening agent is sold by the Ciba Geigy Corporation under the tradename "Tinopal", which are substituted stilbene 2,2′-disulfonic acid products. Preferred Tinopal products are Tinopal 5BM-XC, a 4,4′-Bis[[4-anilino-6[N-2-hydroxyethyl-N-methylamino]-1,3,5-triazin-2-yl]amino]-2,2′-stilbene disulfonic acid disodium salt; Tinopal UNPA, a 4,4′-Bis[[4-anilino-6-[bis (2-hydroxyethyl)amino]-1,3,5-triazin-2-yl]amino]-2,2′-stilbene disulfonic acid; and Tinopal AMS, a 4,4′-Bis[(4-anilino-6-morpholino-1,3,5-triazin-2-yl)amino]-2,2′-stilbene disulfonic acid. The fluorescent whitening agent is present in an amount necessary to thicken to the desired viscosity. Typically the amount of fluorescent whitening agent is from about 0.1 to about 10% by weight. More preferred is about 0.1–5% by weight, and most preferred is about 0.2–0.5%. Also suitable as fluorescent whitening agents are stilbene-type FWAs sold commercially by Mobay Chemical Corp. under the trademarks Phorwite RKH and Phorwite HRS.

Generally, thickening-effective FWAs comprise those having a molecular weight of between about 500–1500 grams/mole, a potential for a zwitterionic charge distribution (i.e., both positive and negative charge on the same molecule), are insoluble at a pH of below about seven and which will precipitate as a colloidal-sized particle. More preferably the FWA should have a molecular weight of between about 700–1000 grams/mole, a zwitterionic charge distribution wherein equal numbers of positive and negative charges are developed, should precipitate as a colloidal particle of under about 10 microns in size and should also be soluble at a basic pH. Most preferred as FWA are those possessing the stilbene structure, with the potential for a negative charge supplied by sulfonic acid groups, and the potential for a positive charge supplied by protonated amine groups.

An example of a class of thickening effective FWAs are those which fall within the American Society for Testing Materials (ASTM) class "DASC" (diamino stilbene disulfonic acid-cyanuric chloride) including DASC subclasses 1 through 5. Examples of DASC FWAs are published in ASTM's *List of Fluorescent Whitening Agents for the Soap and Detergent Industry*, ASTM Data Series DS53A, the disclosure of which is incorporated herein by reference. DASC whiteners all possess the 2,2′-stilbene disulfonic acid structure illustrated by the following figure:

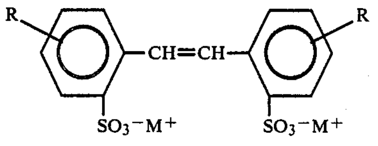

$M^+ = H^+, Na^+, K^+$, etc.

R = a group capable of being protonated

Specific examples of DASC whiteners, include Ciba Geigy's trademarked Tinopal UNPA, UNPS, AMS, 4BM and 5BM, as well as Mobay Chemicals' trademarked Phorwite BBH, RKH, HRS and MBBH. For the purposes of the present invention, "fluorescent whitening agent" (FWA) is deemed to include dyes having structure and/or physical characteristics similar to the thickening-effective fluorescent whitening agent's and which are also thickening effective. Such dyes should also be insoluble at acidic pHs, have a potential for zwitterionic charge distribution, a molecular weight range of between about 500–1500 grams/mole and precipitate as colloidal particles. A preferred class of dyes fitting the above general description of thickening-effective FWAs are the substituted biphenyl diazo dyes. A preferred example of this type of dye is a 3,3'-[[biphenyl]-4,4'-diylbis-(azo)]bis [4-amino-1-naphthalene-sulfonic acid] disodium salt, sold commercially as Congo Red. Mixtures of any of the above FWAs can also be employed.

In order for the fluorescent whitening agent, in association with the surfactant, to thicken, it is necessary that the fluorescent whitening agent be precipitated out as a colloid. This is accomplished by formulating the thickening system with a low pH, on the order of 2–6 and preferably 3–5. The thickening system advantageously does not consume or remove the fluorescent whitening agents in achieving the thickening. The fluorescent whitening agents are thus fully available to perform their nominal function, e.g., whitening. It is also within the scope of the invention to mill FWA particles down to a size range of about 10 microns and add the milled particles to a preacidified surfactant mixture to attain the desired thickening effective colloidal association. Table 1 illustrates viscosities resulting from formulations using four structurally different Tinopals: 5BM-XC, RBS 200, CBS-X and SWN. The remainder of the formulations included the following:

| | Wt. % |
|---|---|
| Surfactant | 4.0 |
| Antioxidant | .01 |
| Fragrance | .01 |
| Base | .18 |
| Fatty Acid Soap | .45 |
| Chelating Agent | .12 |
| Bleach | 10.00 |
| Distilled Water | Balance |
| pH Adjusting Agent | to pH 4.0 |

TABLE 1

| A. Viscosity - Brookfield RVT, Spindle #1, 4 speeds | | | | |
|---|---|---|---|---|
| | 5BM-XC .45% | RBS 200 .26% | CBS-X .22% | SWN .12% |
| 10 rpm | 302 | 22 | 5 | 10 |
| 20 rpm | 189 | 24 | 8 | 15 |
| 50 rpm | 110 | 34 | 10 | 23 |
| 100 rpm | 87 | 48 | 14 | 31 |

Only Tinopal 5BM-XC is a DASC type FWA and it can be seen from the resulting viscosities that only the 5BM-XC resulted in significant thickening. The Tinopal RBS, CBS-X and SWN products are not DASC fluorescent whitening agents, and proved to be ineffective at thickening.

Soap

While significant thickening occurs with only the surfactant and fluorescent whitening agent, it has been found that viscosities can be synergistically increased by the inclusion of a fatty acid or esterfied fatty acid soap. Generally $C_{6-18}$ soaps provide the synergistic increase in thickening. Preferred are saturated, alkyl $C_{6-18}$ soaps, although varying degrees of unsaturation, branching, or esterification will not eliminate the viscosity enhancing effects of the soap. Most preferred are capric acid, lauric acid, myristic acid, and coconut fatty acid (having a chain length distribution of ten to eighteen carbons, and about 55% $C_{12}$) soaps, as well as methyl laurate, or mixtures of any of the foregoing. Because the solubility of the acid form is generally not very good, it is preferred to neutralize the fatty acid soap in situ using a base such as an alkaline-earth-metal or alkali-metal hydroxide. KOH and NaOH are the most preferred bases. Of course, addition of the salt form of the soap also gives acceptable results. A preferred amount of soap is that sufficient to improve viscosity, and typically is about .05 to 5.0 weight %, more preferred is 0.1 to 1.0 weight % and most preferred is 0.3 to 0.5 weight percent. When soap is incorporated into the composition of the invention, it is preferred to make an aqueous solution of the desired surfactant, add thereto an amount of base, most preferably NaOH, calculated to neutralize the amount of fatty acid to be added, then add the fatty acid. The FWA is added to this solution and pH adjustment is typically the final step.

In a second embodiment the present invention is formulated as a thickened bleaching product and includes, in aqueous solution:

a bleach; and the thickening system comprising the surfactant, fluorescent whitening agent and pH adjusting agent.

The thickening system is identical to that described in the first embodiment of the invention. The remaining component, e.g., the bleach is further described below.

Bleach

A liquid bleach source may be selected from various types of bleaches such as halogen, peroxygen and peracid bleaches. The thickening system is compatible with any oxidant bleach which can be suspended in it. In general, the bleach must also be compatible with the acid pH necessary to precipitate the fluorescent whitening agent. The bleach must be able to supply to oxidizing species at the acid pH, and should be resistant to degradation thereby. Halogen bleaches are ordinarily ineffective at acid pHs and are therefore not preferred. It is noted that ionic strength associated with halogen bleaches is neither a prerequisite nor a hindrance to the thickening system; thickening will occur in the presence or absence of ionic strength.

Preferred as bleaches are the peroxygen or peracid bleaches. Peroxygen bleaches are preferred in terms of manufacturing cost. Peracid bleaches may be advantageous in terms of bleaching performance. If a peracid bleach formulation is desired, the thickener of the present invention is an ideal system for suspending peracids. The bleach is present in an amount sufficient to provide effective bleaching, e.g., from about 0.05 to 50% by weight active, more preferably from about 0.1 to 35% by weight active and most preferably from about 0.5 to 15% by weight active depending on the bleaching species chosen. The bleach may be added as an aqueous solution of active ingredient.

In a third embodiment, the invention is formulated as a stabilized, thickened peroxide bleach, and includes, in aqueous solution:

peroxide bleach;

the thickening system comprising the surfactant, fluorescent whitening agent, and pH adjusting agent; and a stabilizing system including a chelating agent and antioxidant.

The thickening system is again as described for the first and second embodiments. The remaining components are described in further detail below.

Peroxide

A hydrogen peroxide source is present as the principal active ingredient and functions as the bleaching agent. The hydrogen peroxide is normally supplied as liquid hydrogen peroxide, although other hydrogen peroxide sources may also function satisfactorily. For example perborate and percarbonate also supply $H_2O_2$ in solution. The peroxide is present in the range of about 0.05–50% by weight active, more preferred is 0.1–35% by weight active, and most preferred is 0.5–15% by weight active. Numerous sources manufacture and/or market hydrogen peroxide on a commercial basis, and one example of a commercial source is the FMC Company of Philadelphia, Pa. Ordinarily the peroxide is purchased as a concentrated aqueous solution, for example a 70% solution, and is diluted with the deionized water to the desired strength.

Stabilizing System

Stabilization of the bleaching composition of the present invention, including the hydrogen peroxide, fluorescent whitening agent, surfactants and any optional dyes and fragrances relies upon the presence of a metal chelating agent. Stabilization is accomplished as fully described in copending U.S. patent application Ser. No. 745,617, filed June 17, 1985, assigned to the same assignee as the present invention and incorporated by reference herein. The following briefly describes the essential components of the stabilizing system. More detailed information may be obtained from the above-referenced application.

The stabilizing system comprises an antioxidant and a chelating agent. It is thought that the chelating agent acts to sequester heavy metal cations, especially polyvalent metals such as copper and iron which are always present in small amounts among the mineral components in water. These heavy metal cations normally have the ability to catalyze peroxide homolysis and to mediate free-radical generation. These capabilities are inhibited by the chelating agent. The stabilizing system also includes an antioxidant which appears to work by tying up free-radicals initially formed in the solution, removing the ability of free-radicals to degrade organic components and also stopping the self-propagating free-radical cascade reaction. By such a mechanism, destruction of the surfactants, fluorescent whitener and optional oxidizable components (e.g., fragrance and dye) is arrested or reduced. Both the chelating agent and antioxidant should be present to attain the desired stability of the peroxide bleaching composition. However, less preferred embodiments of the invention can omit either the chelating agent or antioxidant.

The chelating agent maybe selected from a number of known agents which are effective in chelating heavy metal cations. The chelating agent should be resistant to hydrolysis and oxidation by oxidants. Preferably it should have an acid dissociation constant (pKa) of about 1-9, indicating that it dissociates at low pH's to enhance bonding to metal cations. The most preferred chelating agent is an amino polyphosphonate which is commercially available under the trademark "Dequest" and sold by the Monsanto Company. Specific examples of effective Dequest products include Dequest 2000, Dequest 2010, Dequest 2041 and Dequest 2060.

Other related chelating agents such as pyrophosphates may also be utilized. EDTA-type chelating agents will also perform well. The chelating agent should be present in an amount sufficient to tie up any heavy metal cations present in the solution. The preferred range is 0.02 to 5% by weight, more preferred 0.04 to 3% by weight, and most preferred is 0.06 to 1.0% by weight.

The second component of the stabilizing system is the antioxidant which functions as a free-radical scavenger. Preferred for this purpose are substituted phenols, or more broadly, hydroxy benzenes. Of this class of compounds, butylated hydroxy toluene (BHT) and mono-t-butyl hydroquinone (MTBHQ) have been found to be especially effective. The antioxidant must resist oxidation by $H_2O_2$ and therefore cannot be too strong a reducing agent. It is also desirable that the antioxidant hydroxy benzenes be partially hindered, i.e., have a substituent alkyl or similar group attached to some of the reactive sites on the ring structure. It is necessary to block some of the reactive sites so that reactions with multiple available free-radicals resulting in polymerization and possible phase separation do not occur. BHT and MTBHQ satisfy all of the above criteria and are therefore preferred as antioxidants. BHT is commercially available from the Uniroyal Chemical Company, while MTBHQ is commercially available from the Eastman Chemical Company. Only very small amounts of antioxidant are necessary in the bleach composition. A preferred range is about 0.005–0.4% by weight, more preferred is 0.007–0.03% by weight, and most preferred is 0.01–0.02 by weight.

Optional Ingredients

Optionally, the peroxide bleaching composition may include small amounts of components such as fragrances, commercially available from, for example, International Flavors and Fragrances, and dyes such as acid blue. It is also contemplated that fluorescent whitening agents or dyes which do not fall within the thickening-effective classification could be added to perform only their whitening or dying function. Thickening-effective fluorescent whitening agents would, of course be present to both thicken and whiten, and the extra fluorescent whitening agents would serve to increase brightening without increasing thickening. The balance of the formulation is, of course, water. It is preferred for stability purposes to use deionized or distilled water to reduce metal ion contaminates to as low a level possible. It may be noted however, that even with metal ion contamination of 2–10 ppm or more, the stabilizing system of the present invention remains effective.

Examples of typical thickened stabilized peroxide bleach formulations are set forth below:

| | Wt. % |
|---|---|
| Formulation #1 | |
| Water | 84.68 |
| Surfactant | 4.0 |
| Fragrance | .01 |
| Antioxidant | .01 |
| Base | .12 |
| Soap | .45 |
| FWA | .45 |
| Chelating Agent | .12 |
| Bleach | 10.0 |
| pH Adjusting Agent | .1–.14 |
| pH | 5.0 |
| Viscosity (cP) | 255 |
| Formulation #2 | |
| Water | 84.92 |
| Surfactant | 4.0 |

-continued

| | Wt. % |
|---|---|
| Fragrance | .05 |
| Antioxidant | .05 |
| Base | .18 |
| Soap | .34 |
| FWA | .23 |
| Chelating Agent | .12 |
| Bleach | 10.0 |
| pH Adjusting Agent | .1-.14 |
| pH | 4.0 |
| Viscosity (cP) | 225 |

Highly thickened, transparent gel or paste compositions were made using relatively high levels of FWA and surfactant in accordance with the following formulation:

| Formulation #3 | Wt. % |
|---|---|
| Water | 81.9 |
| Surfactant | 12.3 |
| FWA | 2.5 |
| pH Adjusting Agent | 3.3 |
| pH | 4.0 |

A preferred process for making the thickened formulations of the present invention begins by preparing an aqueous solution of the desired type and amount of surfactant. If the thickener is to include only the surfactant, FWA and pH adjusting agent, the FWA is added next and addition of the pH adjusting agent is typically the last step. The pH adjusting agent can precede the FWA; it is important only that the surfactant precede at least FWA or pH adjusting agent. When a soap is incorporated, it is preferred to add to the aqueous surfactant solution an amount of base calculated to neutralize the amount of fatty acid, then add the fatty acid. The FWA and pH adjusting agent are then added as above. A bleach, stabilizing system, and/or any optional ingredients may be added at any point prior to addition of FWA or pH adjusting agent, and preferably prior to both.

Experimental

Viscosity of the thickening system, comprising the major components of water, surfactant, FWA and soap was evaluated, as was phase stability of the thickening system with each of the major components omitted. The specific materials included in the composition were:

Surfactant-Neodol 25-7, 4% by weight;

FWA-Tinopal 5BM-XC, 0.45% by weight;

Soap-lauric acid, neutralized in situ to sodium laurate, 0.5% by weight;

and the balance was water.

The control (composition 1) included water, Neodol, FWA and soap. Three additional compositions were made up, identical to the control minus one of the thickening system components. Thus composition two contained water, Neodol and the FWA; composition three contained water, FWA and soap; and composition four contained water, soap and Neodol. Viscosity was checked immediately after sample preparation and results are shown in Table 2. Samples 2, 3 and 4 exhibited varying degrees of instability during 72 hours of storage at 70° F.

TABLE 2

Viscosity (cP) - Brookfield RVT, Spindle #1, 4 speeds

| | Initial | | | |
|---|---|---|---|---|
| | 1 Control | 2 No Soap | 3 No Surfactant | 4 No FWA |
| 10 rpm | 300 | 121 | 6 | 7 |
| 20 rpm | 175 | 69 | 7 | 10 |
| 50 rpm | 103 | 43 | 9 | 14 |
| 100 rpm | 82 | 44 | 12 | 19 |

Table 3 shows the effect of variations in soap on the viscosity and phase stability of the composition of the present invention. The following soaps were tested:

capric acid, lauric acid, methyl laurate, myristic acid, and coconut fatty acid.

Each fatty acid material was blended into the hydrogen peroxide formula of formulation 1, at a molar equivalent of 0.0225M (between about 0.4 to 1.0% by weight depending on the fatty acid). Sodium hydroxide was first added to neutralize the fatty acid in situ. Viscosities were checked at four different spindle RPMs, and were tested at four times: initially at completion of the batch, after 24 hours at 70° F., after three days of 70° F., and after two weeks at 120° F. Table 3 illustrates the viscosities of the formulations incorporating each of the fatty acid soaps at the four times tested.

TABLE 3

A. Viscosity (cP) - Brookfield RVT, Spindle #1, 4 speeds

| | Capric Acid | Lauric Acid | Methyl Laurate | Myristic Acid | Coconut Fatty Acid |
|---|---|---|---|---|---|
| | | 1. Initial | | | |
| 10 rpm | 598 | 253 | 213 | 196 | 168 |
| 20 rpm | 368 | 152 | 116 | 116 | 96 |
| 50 rpm | 200 | 102 | 62 | 65 | 66 |
| 100 rpm | 100 | 89 | 54 | 60 | 66 |
| | | 2. 24 Hours | | | |
| 10 rpm | 520 | 152 | 92 | 194 | |
| 20 rpm | 342 | 102 | 61 | 128 | |
| 50 rpm | 200 | 69 | 46 | 82 | N/A |
| 100 rpm | 100 | 69 | 47 | 73 | |
| | | 3. 3 Days | | | |
| 2.5 rpm | 2260 | — | — | — | — |
| 5 rpm | 1400 | — | — | 848 | — |
| 10 rpm | 860 | 416 | 266 | 521 | 422 |
| 20 rpm | 500 | 263 | 157 | 318 | 266 |
| 50 rpm | 200 | 146 | 88 | 174 | 153 |
| 100 rpm | 100 | 100 | 71 | 100 | 100 |
| | | 4. 2 Weeks @ 120° F. | | | |
| 2.5 rpm | 2260 | | | | |
| 5 rpm | 1650 | | | | |
| 10 rpm | 1000 | | Unstable | | |

Table 4 illustrates the effects of various acids and pHs on viscosities and phase stability. Again, viscosity was measured initially, at one week, and at ten days, all at room temperature (70° F.). While initial viscosities were slightly higher at pH 3, the one week and ten day sample exhibited significantly higher viscosities at pH 5. The phosphoric acid samples also generally resulted in somewhat higher viscosities then samoles adjusted with hydrochloric acid. Phase stability of samples at one week was good for all but the HCL, pH 3 sample which had separated into two layers. After ten days, the hydrochloric acid samples showed some signs of flocculation, evidencing phase instability. The phosphoric acid samples at pH 3 and 4 were homogeneous with smooth consistencies and no signs of phase instability. The phosphoric acid sample at pH 5 was homogeneous but had a slightly lumpy texture.

TABLE 4

| A. Viscosity(cP) - Brookfield RVT, Spindle #1, 4 speeds | | | | |
|---|---|---|---|---|
| | | pH 3 | pH 4 | pH 5 |
| | | 1. Initial | | |
| $H_3PO_4$ | 5 rpm | 428 | 474 | 416 |
| | 10 rpm | 237 | 263 | 255 |
| | 20 rpm | 133 | 149 | 160 |
| | 50 rpm | 72 | 79 | 97 |
| HCL | 5 rpm | 584 | 484 | 292 |
| | 10 rpm | 320 | 268 | 182 |
| | 20 rpm | 178 | 130 | 117 |
| | 50 rpm | 88 | 74 | 72 |
| | | 2. 1 Week | | |
| $H_3PO_4$ | 5 rpm | 350 | 864 | 1570 |
| | 10 rpm | 197 | 502 | 928 |
| | 20 rpm | 118 | 306 | 500 |
| | 50 rpm | 68 | 173 | 200 |
| HCL | 5 rpm | — | 694 | 1220 |
| | 10 rpm | — | 396 | 773 |
| | 20 rpm | — | 237 | 446 |
| | 50 rpm | — | 127 | 200 |
| | | 3. 10 Days | | |
| $H_3PO_4$ | 5 rpm | 260 | 910 | 1840 |
| | 10 rpm | 153 | 533 | 1000 |
| | 20 rpm | 94 | 326 | 500 |
| | 50 rpm | 59 | 182 | 200 |
| HCL | 5 rpm | — | 764 | 1420 |
| | 10 rpm | — | 436 | 877 |
| | 20 rpm | — | 268 | 500 |
| | 50 rpm | — | 153 | 200 |

Stability

Chemical stability of the peroxide, dye and FWA, was tested using the following formulation:

| Ingredient | Wt % |
|---|---|
| Peroxide | 10.0 |
| FWA | 0.32 |
| Dye | 0.0043 |
| Surfactant | 4.0 |
| Base | 0.24 |
| Fragrance | 0.05 |
| Antioxidant | 0.01 |
| Chelating Agent | 0.12 |
| pH Adjusting Agent | 1.61 |
| Soap | 0.39 |
| Deionized Water | 83.26 |

Samples were made up and innoculated with the following metals: 0.3 ppm copper; 0.2 ppm iron; 0.1 ppm manganese; 0.2 ppm nickel; and 0.2 ppm chronium.

After storage for two weeks at 120° F. the samples were tested for percentage remaining peroxide, FWA and dye, and the viscosity was measured. Test results are illustrated in table 5 and show that 98.5% of the peroxide remained, 104% of the FWA was found, and 108% of the dye was found. In addition to the excellent chemical stability of the components, no settling of FWA was observed. This was confirmed by measuring FWA levels at the top, middle and bottom of the container used to store the formulation. All measurements showed about 104% of FWA remaining. Final viscosity of the formulation was 248 cP, a decrease of only about 10%.

TABLE 5

| | Initial | Final | % remaining |
|---|---|---|---|
| $H_2O_2$[1] | 3.47 | 3.42 | 98.5 |
| FWA[2] | 0.3189 | 0.3308 | 104 |
| Dye[2] | 0.1254 | 0.1361 | 109 |
| pH | 4.0 | 3.73 | 93 |

TABLE 5-continued

| | Initial | Final | % remaining |
|---|---|---|---|
| Viscosity[3] | 276 | 248 | 90 |

[1]Measured via Iodometric Titration.
[2]Measured as absorbance units via a Perkin-Elmer spectrophotometer.
[3]Measured on a Brookfield RVT, No. 1 Spindle at 5 rpm.

More extensive chemical stability studies were conducted on formulations which were similar, but without the thickening-effective FWAs. The following formulation was used:

| Ingredient | Wt % |
|---|---|
| Peroxide | 3.5 |
| FWA | 0.16 |
| Dye | 0.0005 |
| Surfactant | 3.5 |
| Fragrance | 0.01 |
| Antioxidant | 0.01 |
| Chelating Agent | 0.12 |
| pH Adjusting Agent | 0.1 |
| Water | balance |

The following examples in Table 6 were made and tested:

TABLE 6

| | CHELATING AGENT | WT. % | ANTIOXIDANT | WT. % |
|---|---|---|---|---|
| 1. | 0 | 0 | 0 | 0 |
| 2. | Dequest 2010[1] | 0.12 | 0 | 0 |
| 3. | Dequest 2060[2] | 0.12 | 0 | 0 |
| 4. | Dequest 2041[3] | 0.12 | 0 | 0 |
| 5. | 0 | 0 | Butyl Hydroxy Toluene[4](BHT) | 0.01 |
| 6. | 0 | 0 | Ethyl 754[5] | 0.01 |
| 7. | 0 | 0 | Cyanox 2246[6] | 0.01 |
| 8. | 0 | 0 | Ethyl 733[7] | 0.01 |
| 9. | 0 | 0 | Anox NSM[8] | 0.01 |
| 10. | 0 | 0 | Santoflex AW[9] | 0.01 |
| 11. | 0 | 0 | Napthlamine[10] | 0.01 |
| 12. | Dequest 2010 | 0.12 | BHT | 0.01 |
| 13. | Dequest 2010 | 0.12 | Ethyl 754 | 0.01 |
| 14. | Dequest 2010 | 0.12 | Cyanox 2246 | 0.01 |
| 15. | Dequest 2010 | 0.12 | Ethyl 733 | 0.01 |
| 16. | Dequest 2010 | 0.12 | Anox NSM | 0.01 |
| 17. | Dequest 2010 | 0.12 | Santoflex AW | 0.01 |
| 18. | Dequest 2010 | 0.12 | Napthlamine | 0.01 |
| 19. | Dequest 2060 | 0.12 | BHT | 0.01 |
| 20. | Dequest 2060 | 0.12 | Ethyl 754 | 0.01 |
| 21. | Dequest 2060 | 0.12 | Cyanox 2246 | 0.01 |
| 22. | Dequest 2060 | 0.12 | Ethyl 733 | 0.01 |
| 23. | Dequest 2060 | 0.12 | Anox NSM | 0.01 |
| 24. | Dequest 2060 | 0.12 | Santoflex AW | 0.01 |
| 25. | Dequest 2060 | 0.12 | Napthlamine | 0.01 |
| 26. | Dequest 2041 | 0.12 | BHT | 0.01 |
| 27. | Dequest 2041 | 0.12 | Ethyl 754 | 0.01 |
| 28. | Dequest 2041 | 0.12 | Cyanox 2246 | 0.01 |
| 29. | Dequest 2041 | 0.12 | Ethyl 733 | 0.01 |
| 30. | Dequest 2041 | 0.12 | Anox NSM | 0.01 |
| 31. | Dequest 2041 | 0.12 | Santoflex AW | 0.01 |

TABLE 6-continued

| | CHELATING AGENT | WT. % | ANTIOXIDANT | WT. % |
|---|---|---|---|---|
| 32. | Dequest 2041 | 0.12 | Napthlamine | 0.01 |

[1]Dequest 2010 (60% active) is an amino polyphosphonate available from the Monsanto Co.
[2]Dequest 2060 (50% active) is an amino polyphosphonate available from the Monsanto Co.
[3]Dequest 2041 (90% active) is an amino polyphosphonate available from the Monsanto Co.
[4](Shell Ionol) BHT (100% active) available from the Shell Chemical Co.
[5]Ethyl 754 (100% active) available from the Ethyl Corporation, is 4-hydroxymethyl 2, 2,6-di-T—butyl phenol.
[6]Cyanox 2246 (100% active) available from the American Cyanamid, is a 2, 2'methylene-bis-(6-T—butyl-p-cresol).
[7]Ethyl 733 (100% active) available, from Ethyl Corporation, is an alkylated phenol.
[8]Anox NSM (Pennox A, etc.) (100% active) available from the Bozzetto Industrie Chimiche, is a alkylated diphenyl amine.
[9]Santoflex AW (100% active), available from the Monsanto Co., is a dihydroquinoline.
[10]Napthylamine (98% active) available from the Aldrich Chemical Co., is an N—phenyl-alpha napthylamine.

To assess the stabilizing effect of the added chelating agents and antioxidants, the samples were initially measured for available oxygen (via Iodometric titration) and amounts of dye (without dilution) and brightener (dilution factor: 3 mls. formulation/1,000 mls. water). Amounts of dye and brightener were measured as absorbance units via a Beckman Spectrophotometer set at wavelengths 598 nm and 344 nm, respectively. Next, each sample was innoculated with 6 ppm heavy metal ions (3 ppm Fe (III); 3 ppm Cu (II)) and stored at 100° C. for three hours. The available oxygen for the hydrogen peroxide and the absorbance values for the dye and the brightener were then read again. Storage at 100° C. for three hours approximates long term storage of about 5 months at room temperature. The data observed were collected and tabulated in Table 7 below:

TABLE 7

| EXAMPLE | $AO_I$[1] | $AO_F$ | % AO | $DYE_I$[2] | $DYE_F$ | % DYE | $FWA_I$[3] | $FWA_F$ | % FWA |
|---|---|---|---|---|---|---|---|---|---|
| 1 | 17920 | 10080 | 56 | 0.171 | 0 | 0 | 0.443 | 0 | 0 |
| 2 | 17920 | 16160 | 90 | 0.172 | 0 | 0 | 0.437 | 0.1 | 23 |
| 3 | 17280 | 15680 | 91 | 0.168 | 0 | 0 | 0.441 | 0.12 | 27 |
| 4 | 15840 | 12640 | 80 | 0.18 | 0 | 0 | 0.477 | 0 | 0 |
| 5 | 17760 | 14240 | 80 | 0.173 | 0 | 0 | 0.448 | 0.02 | 4 |
| 6 | 17600 | 11360 | 65 | 0.168 | 0 | 0 | 0.461 | 0 | 0 |
| 7 | 17760 | 17280 | 97 | 0.17 | 0 | 0 | 0.47 | 0.21 | 45 |
| 8 | 17680 | 17440 | 99 | 0.169 | 0 | 0 | 0.468 | 0.28 | 60 |
| 9 | 18080 | 13280 | 73 | 0.199 | 0 | 0 | 0.466 | 0 | 0 |
| 10 | 17600 | 12000 | 68 | 0.21 | 0 | 0 | 0.466 | 0 | 0 |
| 11 | 17920 | 17280 | 96 | 0.172 | 0 | 0 | 0.475 | 0.311 | 65 |
| 12 | 17760 | 18240 | 103 | 0.173 | 0.157 | 91 | 0.443 | 0.458 | 103 |
| 13 | 17280 | 17600 | 102 | 0.169 | 0.16 | 95 | 0.478 | 0.445 | 93 |
| 14 | 17280 | 17120 | 99 | 0.17 | 0.162 | 95 | 0.472 | 0.452 | 96 |
| 15 | 17280 | 17600 | 102 | 0.169 | 0.153 | 91 | 0.456 | 0.446 | 98 |
| 16 | 17360 | 16960 | 98 | 0.166 | 0.16 | 96 | 0.468 | 0.444 | 95 |
| 17 | 17360 | 17280 | 100 | 0.207 | 0 | 0 | 0.473 | 0.344 | 73 |
| 18 | 17440 | 17440 | 100 | 0.17 | 0.195 | 115 | 0.483 | 0.454 | 94 |
| 19 | 17120 | 16960 | 99 | 0.176 | 0.163 | 93 | 0.467 | 0.429 | 92 |
| 20 | 17120 | 16640 | 97 | 0.178 | 0.163 | 92 | 0.469 | 0.428 | 91 |
| 21 | 16960 | 17360 | 102 | 0.178 | 0.168 | 94 | 0.463 | 0.432 | 93 |
| 22 | 17440 | 17280 | 99 | 0.177 | 0.167 | 94 | 0.465 | 0.417 | 90 |
| 23 | 17120 | 16800 | 98 | 0.216 | 0.155 | 72 | 0.461 | 0.382 | 83 |
| 24 | 17360 | 16960 | 98 | 0.208 | 0 | 0 | 0.465 | 0.36 | 77 |
| 25 | 17600 | 17120 | 97 | 0.181 | 0.167 | 92 | 0.48 | 0.436 | 91 |
| 26 | 17760 | 17200 | 97 | 0.181 | 0.164 | 91 | 0.48 | 0.428 | 89 |
| 27 | 18160 | 17920 | 99 | 0.184 | 0.169 | 92 | 0.498 | 0.449 | 90 |
| 28 | 17440 | 17200 | 99 | 0.181 | 0.165 | 91 | 0.481 | 0.428 | 89 |
| 29 | 17440 | 17280 | 99 | 0.181 | 0 | 0 | 0.479 | 0.303 | 63 |
| 30 | 17440 | 16480 | 94 | 0.209 | 0 | 0 | 0.483 | 0.296 | 61 |
| 31 | 17280 | 15680 | 91 | 0.207 | 0 | 0 | 0.483 | 0.133 | 28 |
| 32 | 17600 | 16720 | 95 | 0.183 | 0 | 0 | 0.491 | 0.397 | 81 |

[1]$AO_I$ = Initial reading of available oxygen; $AO_F$ = Final reading.
[2]$DYE_I$ = Initial reading of dye; $DYE_F$ = Final reading.
[3]$FWA_I$ = Initial reading of brightener; $FWA_F$ = Final reading.

The above results show that surprising and dramatically improved stability results when the inventive stabilizing system of an antioxidant and a metal chelating agent are used.

Example 1, which uses neither chelating agent nor antioxidant, has no stabilizing effects on dyes or brighteners. Examples 2-4, containing only metal chelating agents, have no stabilizing effect on dyes, and minimal to no effect on brighteners. Examples 5-11, containing only antioxidants, have no stabilizing effect on dyes, and minimal to no effect on brighteners. Examples 12-32, on the other hand, in which both metal chelating agent and antioxidant are present, show dramatic improvement in stability. Occasionally, some examples (17, 24, 29-32) show lack of stabilizing effect on dyes, but overall, increased chemical stability above and beyond that of any of examples 1, 2-4 and 5-11, is demonstrated.

Although described in terms of the presently preferred embodiments, it is to be understood that such disclosure is not to be interpreted as limiting. Various modifications and alterations will no doubt become apparent to one skilled in the art after having read the above disclosure. Accordingly, it is intended that the appended claims be interpreted as covering all such modifications and alterations as fall within the true spirit and scope of the invention.

We claim:

1. A thickening system for cleaning and bleaching compositions comprising, in aqueous solution (a) a surfactant, present in an FWA-stabilizing amount and selected from the group consisting of nonionics, betaines, alkyl aryl sulfonates and mixtures thereof;

(b) an acid-insoluble fluorescent whitening agent, selected from the group consisting of stilbene disulfonic acid FWA's substituted with a protonizable group, substituted biphenyl diazo dyes, and mixtures thereof, and having a molecular weight of between about 500–1500, a potential for zwitterionic charge distribution in an acid medium and which is an insoluble colloidal sized particle in an acid medium, the fluorescent whitening agent being present in an amount of between about 0.1 and 10.0 weight percent whereby the composition viscosity is at least about 50 cP; and (c) a pH adjusting agent in an amount sufficient to precipitate the fluorescent whitening agent as a colloidal particle and whereby a homogeneous composition results.

2. The thickening system of claim 1 wherein the surfactant is a nonionic surfactant selected from the group consisting of polyethoxylated alcohols, ethoxylated alkyl phenols, anhydrosorbitol esters, alkoxylated anhydrosorbitol esters, and polyethylene glycol ethers, having and HLB value of about 11–13, and mixtures thereof, and the fluorescent whitening agent is a stilbene 2,2'- disulfonic acid substituted with protonated amine groups.

3. The thickening system of claim 2 wherein the surfactant is present in an amount of from about 1.0 to 20.0% by weight.

4. The thickening system of claim 3 wherein
the pH adjusting agent is an acid; and
the composition pH is between about 2 and 6.

5. The thickening system of claim 4 and further including
a bleach, present in an amount of from about 0.05 to 50% active by weight.

6. The thickening system of claim 2 wherein
the nonionic surfactant is a mixture of twelve to fifteen carbon length ethoxylated alcohols with about seven ethoxy groups per molecule.

7. The thickening system of claim 1 and further including
about 0.05 to 5.0 weight percent of a $C_{6-18}$ fatty acid soap.

8. A chemical stabilized, thickened peroxygen bleaching composition comprising, in aqueous solution (a) a peroxygen bleach, present in a bleaching-effective amount;

(b) a chemical stabilizing system comprising a partially hindered hydroxybenzene antioxidant and a chelating agent having a pKa of about 1–9; and (c) a thickening system comprising an FWA-stabilizing amount of a surfactant selected from the group consisting of nonionics, betaines, alkyl aryl sulfonates and mixtures thereof, about 0.1 to 10.0 weight percent of an acid-insoluble fluorescent whitening agent having a molecular weight of between about 500–1500, a potential for a zwitterionic charge distribution and which is an insoluble colloidal particle in an acidic medium, and a pH adjusting agent in an amount sufficient to precipitate the fluorescent whitening agent whereby a homogeneous composition results.

9. The composition of claim 8 wherein
the chelating agent is an amino polyphosphonate, the surfactant is a nonionic surfactant having an HLB value of between about 11–13, and the pH adjusting agent is an acid, and is added in an amount sufficient to provide a composition pH of between about 2–6.

10. The composition of claim 9 wherein
the nonionic surfactant is selected from the group consisting of polyethoxylated alcohols, ethoxylated alkyl phenols, anhydrosorbitol esters, alkoxylated anhydrosorbitol esters, and polyethylene glycol ethers, and mixtures thereof; and
the fluorescent whitening agent is selected from the group consisting of stilbene disulfonic acids substituted with a protonizable group, substituted biphenyl diazo dyes, and mixtures thereof.

11. In a peroxygen bleach composition comprising a hydrogen peroxide bleach in aqueous solution, the improvement comprising (a) a chemical stabilizing system comprising a chelating agent having a pKa of about 1–9, present in an amount sufficient to tie up a quantity of heavy metal cations, and a partially hindered hydroxybenzene antioxidant, present in an amount sufficient to tie up a quantity of free radicals; and (b) a thickening system including a FWA-stabilizing amount of a surfactant, selected from the group consisting of nonionics having an HLB value of 11–13, betaines, alkyl aryl sulfonates and mixtures thereof, about 0.1–10.0 weight percent of an acid-insoluble fluorescent whitening agent having a molecular weight of between about 500–1500, a potential for a zwitterionic charge distribution and which precipitates as an insoluble colloidal particle in an acid medium, and a pH adjusting agent in an amount sufficient to precipitate the fluorescent whitening agent.

12. The composition of claim 11 and further including about 0.05 to 5.0% of a fatty acid soap of between six and eighteen carbons in length.

13. The composition of claim 11 wherein
the pH adjusting agent is an acid, and is added in an amount sufficient to result in a composition pH of between about 2–6.

14. The composition of claim 11 wherein
the surfactant is a nonionic surfactant, selected from the group consisting of polyethoxylated alcohols, ethoxylated alkyl phenols, anhydrosorbitol esters, alkoxylated anhydrosorbitol esters, and polyethylene glycol ethers, and mixtures thereof; and
the fluorescent whitening agent is selected from the group consisting of stilbene disulfonic acids substituted with protonizable groups, substituted biphenyl diazo dyes, and mixtures thereof.

15. A method for preparing a thickening system for use with cleaning products comprising (a) preparing an aqueous solution of a FWA-stabilizing amount of an acid-compatible and bleach resistant surfactant, selected from the group consisting of nonionics having an HLB value of between about 11–13, betaines, alkyl aryl sulfonates and mixtures thereof;

(b) adding to the solution of (a) about 0.1–10.0 weight percent of an acid insoluble fluorescent whitening agent having a molecular weight of between about 500–1500, a potential for zwitterionic charge distribution, and which precipitates as an insoluble colloidal particle in an acidic medium, the fluorescent whitening agent being initially soluble in the solution of (a); and (c) adding sufficient pH adjusting agent to the solution of (b) to result in a pH of between about 2 and 6 and whereby the fluorescent whitening agent precipitates as a colloid.

16. The method of claim 15 and further including (a) adding a quantity of base prior to fluorescent whitening agent addition, the amount of base added being that necessary to neutralize a preselected amount of a fatty acid to yield a soap; and (b) adding about 0.05 to 5% of a six to eighteen carbon fatty acid to the base whereby a soap is formed, the fatty acid being added prior to addition of the fluorescent whitening agent.

17. The method of claim 15 and further including the steps of (a) adding a bleaching-effective amount of a bleach; and (b) adding a chemical stabilizing system comprising a chelating agent, having a pKa of about 1–9, in an amount sufficient to tie up a quantity of heavy metal cations, and a partially hindered hydroxybenzene antioxidant in an amount sufficient to tie up a quantity of free radicals.

18. The method of claim 15 wherein the surfactant is a nonionic surfactant, selected from the group consisting of polyethoxylated alcohols, ethoxylated alkyl phenols, anhydrosorbitol esters, alkoxylated anhydrosorbitol esters, and polyethylene glycol ethers, and mixtures thereof; and the fluorescent whitening agent is selected from the group consisting of stilbene disulfonic acids substituted with protonizable groups, substituted biphenyl diazo dyes, and mixtures thereof.

19. A method for preparing a thickening system for cleaning products comprising (a) preparing an aqueous solution of a FWA-stabilizing amount of an acid-compatible surfactant, selected from the group consisting of nonionics having an HLB value of between about 11–13, betaines, alkyl aryl sulfonates and mixtures thereof;

(b) milling a quantity of an acid-insoluble fluorescent whitening agent, having a molecular weight of between about 500–1500 and a potential for zwitterionic charge distribution, to yield colloidal size particles of less than about 10 microns;

(c) adding a quantity of a pH adjusting agent to the solution of (a) to result in a solution pH of between about 2–6; and (d) adding between about 0.1–10.0 weight percent of the milled fluorescent whitening agent thereto to result in a colloidal, homogeneous suspension.

20. The method of claim 19 and further including adding about 0.05 to 5.0% of a fatty acid soap of between about six and eighteen carbons in length.

21. The method of claim 19 wherein the surfactant is a nonionic surfactant, selected from the group consisting of polyethoxylated alcohols, ethoxylated alkyl phenols, anhydrosorbitol esters, alkoxylated anhydrosorbitol esters, polyethylene glycol ethers, and mixtures thereof; and the fluorescent whitening agent is selected from the group consisting of stilbene disulfonic acids substituted with protonizable groups, substituted biphenyl diazo dyes, and mixtures thereof.

22. A thickening system for cleaning and bleaching compositions, comprising, in aqueous solution (a) a surfactant, present in a thickening-effective amount and selected from the group consisting of polyethoxylated alcohols, ethoxylated alkyl phenols, anhydrosorbitol esters, alkoxylated anhydrosorbitol esters, and polyethylene glycol ethers, having an HLB value of about 11–13, betaines, alkyl aryl sulfonates and mixtures thereof;

(b) an acid-insoluble fluorescent whitening agent, selected from the group consisting of stilbene disulfonic acid FWA's substituted with a protonizable group, substituted biphenyl diazo dyes, and mixtures thereof, and having a molecular weight of between about 500–1500, a potential for zwitterionic charge distribution in an acid medium and which is an insoluble colloidal sized particle in an acid medium, the fluorescent whitening agent being present in an amount of between about 0.1 and 10.0 weight percent whereby the composition viscosity is at least about 50 cP;

(c) an acidic pH adjusting agent in an amount sufficient to result in a composition pH of between about 2–6.and to precipitate the fluorescent whitening agent as a colloidal particle and whereby a homogeneous composition results; and (d) a stabilizing-effective amount of a $C_{6-18}$ fatty acid soap.

* * * * *